United States Patent [19]

Gilger

[11] 4,064,046

[45] Dec. 20, 1977

[54] SELF-CLEANING FILTER APPARATUS

[76] Inventor: Lloyd Dwight Gilger, 525B Dixie Drive, Palm Bay, Fla. 32905

[21] Appl. No.: 692,000

[22] Filed: June 2, 1976

[51] Int. Cl.$^2$ .................. B01D 29/16; B01D 35/02; B01D 35/14

[52] U.S. Cl. .................................. 210/94; 210/238; 210/416 R; 210/440; 210/460

[58] Field of Search ............... 210/94, 437, 438, 441, 210/456, 460, 461, 433 R, 416 R, 440, 238

[56] References Cited

U.S. PATENT DOCUMENTS

| 55,822 | 6/1866 | Cornelius | 210/460 X |
|---|---|---|---|
| 847,537 | 3/1907 | Abbott | 210/441 |
| 1,331,237 | 2/1920 | Burris | 210/441 |
| 1,876,439 | 9/1932 | Whaley | 210/433 R |
| 2,584,387 | 2/1952 | Harvuot | 210/437 |
| 3,081,876 | 3/1963 | Bizard | 210/412 X |
| 3,105,042 | 9/1963 | Roosa | 210/94 |
| 3,681,562 | 8/1972 | Winzen | 210/94 |

Primary Examiner—Morris O. Wolk
Assistant Examiner—Arnold Turk
Attorney, Agent, or Firm—Duckworth, Hobby & Allen

[57] ABSTRACT

A filter apparatus for use with sprinkler systems, and the like, is self-cleaning and has a filter casing with an input and output for water to pass into and out of the filter casing. An elongated filter support is attached to the output and extends into the filter casing. The filter support has passageways therethrough and has a filter screen attached thereover for filtering liquid passing thrugh the screen, the filter support and out the output of the casing. The input to the casing directs water parallel to and around the filter screen so as to flush trash therefrom which can accumulate at one end of the casing. A transparent portion of the filter casing allows for quick inspection of the filter element and a rapid disconnect for a removable casing portion allows the removal of trash and the replacement of filter elements.

5 Claims, 5 Drawing Figures

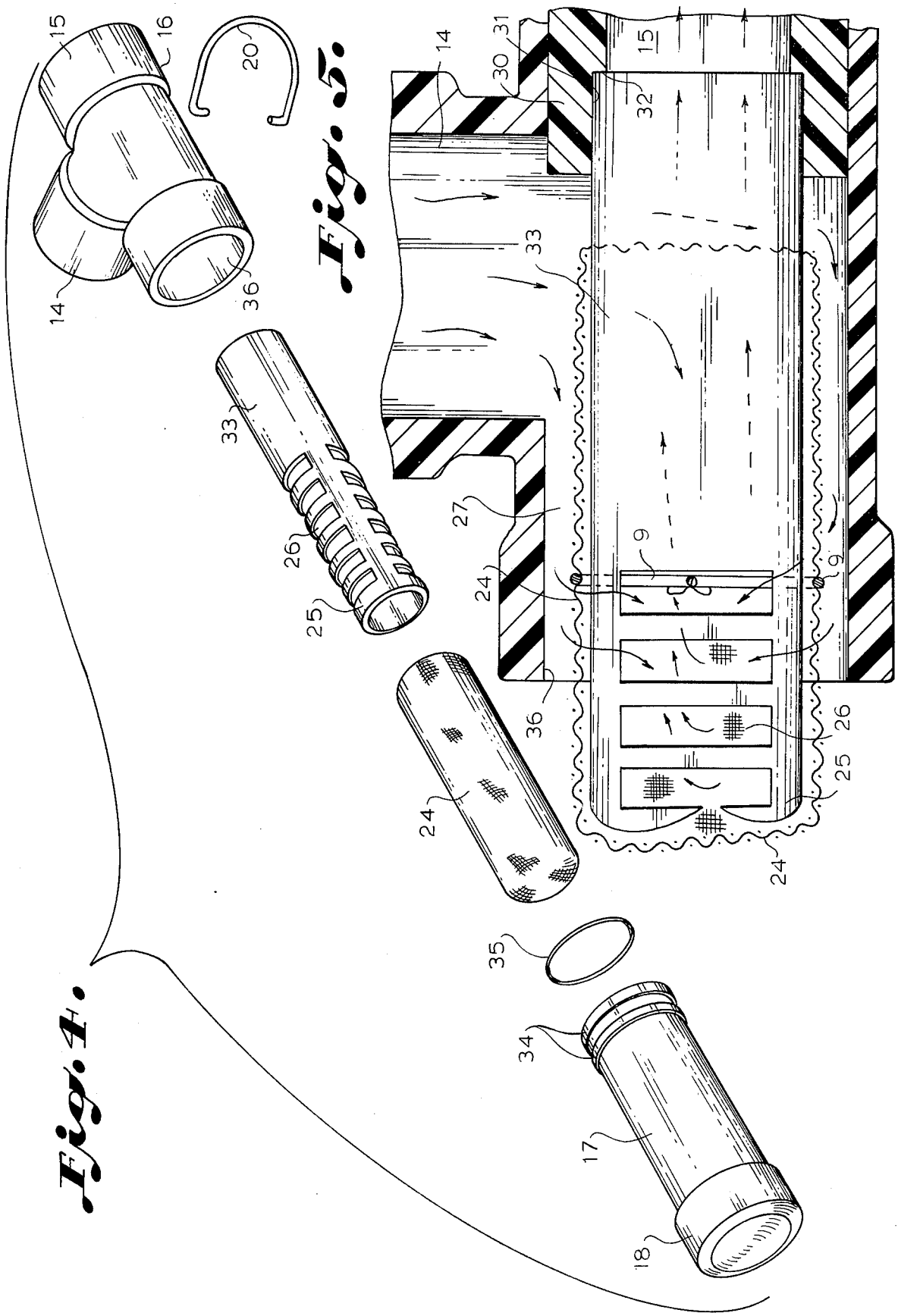

SELF-CLEANING FILTER APPARATUS

BACKGROUND OF THE INVENTION

The present invention relates to filters and especially to self-cleaning filters requiring infrequent servicing and having a transparent casing portion for viewing the filter element.

In the past, a great variety of filters of all types have been provided for filtering all different types of fluids including many types of filters for filtering water from wells and the like. The present invention is directed towards a filter for filtering water pumped from a well, lake, or other source for use in commercial or home sprinkler systems but is also adapted for use with any type of water distribution system. However, in sprinkler systems, especially those connected to their own well and pump system, small particles of sand tend to be drawn with the water through the sprinkler systems. The sand can do considerable damage by abrasion as it moves through the distribution system and especially if it gets lodged in the moving parts of a sprinkler head where it can cause rapid wear and malfunction of the sprinkler head. Filters have been commonly suggested to prevent the sand from getting into the sprinkler head and typically require only a screen to prevent the larger particles from entering the water distribution system. These filters, however, tend to rapidly clog up from the accumulation of trash not only from wells but from water pumped from lakes, rivers, or open bodies of water so that the filters have to be frequently cleaned and replaced. Checking of the filters also presents a problem because of the time consumed in opening up the pipes or filter casings just to determine if the filter is clogged and then performing the necessary repair. The present invention overcomes these prior art disadvantages by providing a self-cleaning filter which allows substantially longer operation of the filter without clogging prior to a sufficient accumulation of trash to warrant cleaning of the filter casing. In addition, the present filter provides for instant determination of whether the filter element is clogged and a quick disconnect for removing a portion of the filter casing and filter element for cleaning.

SUMMARY OF THE INVENTION

The present invention relates to a self-cleaning filter for connection to a water pumping system pumping water from wells, lakes, rivers, or the like, which has a filter casing having an output from the casing for connection to a water distribution system and an input for connection to a water pump for receiving water from a water source. An elongated filter support is attached over one end of the output and extends into the filter casing. The filter support has openings therein and a filter screen attached thereover. The input to the filter casing directs the input water parallel to and adjacent to the filter screen away from the ouput so that the filter screen is continuously flushed from the side by the liquid driving the trash towards one end of the casing and also creating a turbulence for loosening the trash caught in the filter. A transparent cover over the filter element allows the rapid inspection of the filter element, and a quick disconnect system allows the rapid removal and replacement of the filter screen.

BRIEF DESCRIPTION OF THE DRAWINGS

Other objects, features and advantages of the present invention will be apparent from the written description and the drawings in which:

FIG. 4 is an exploded perspective view of the embodiment of FIG. 1; and

FIG. 5 is a sectional view taken on the line 5—5 of FIG. 1.

DESCRIPTION OF THE PREFERRED EMBODIMENTS

Figure 1:
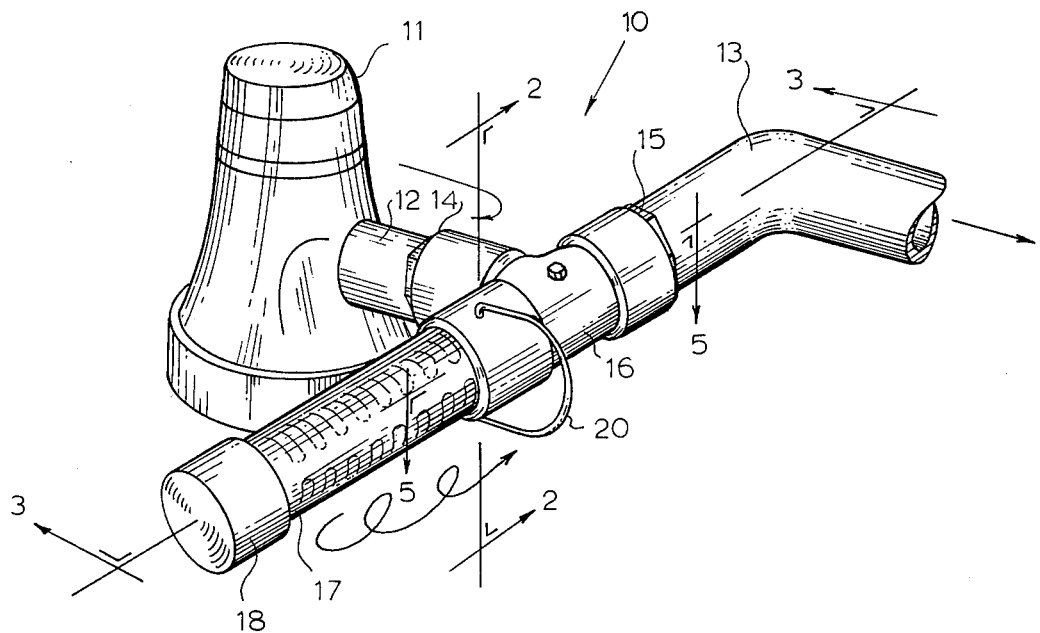
FIG. 1 is a perspective view of a self-cleaning filter in accordance with the present invention connected to a well pump.
Figure 2:
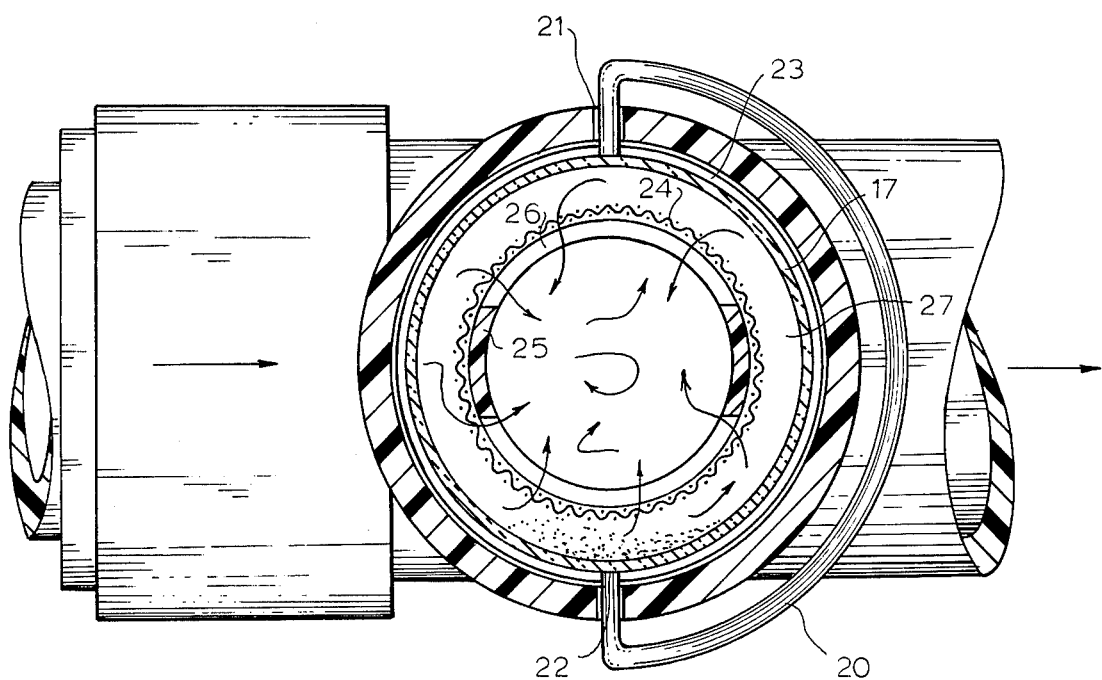
FIG. 2 is a sectional view taken on the line 2—2 of FIG. 1.

Referring now to the drawings, a filter 10 is seen connected to a well pump 11 by a header pipe 12 and to a distribution pipe 13. The header pipe 12 is connected to the input 14 of the filter 10 while the distribution pipe 13 is connected to the output 15 of the filter 10. The filter 10 includes a T-shaped casing 16 plus a transparent casing 17 attached to one T of the casing 16 and a trap 18 for collecting trash capping the end of the transparent casing portion 17. A U-shaped snap member 20 is attached through a pair of openings 21 and 22 for engaging the end of transparent cover 17 adjacent an O-ring 23 for holding the transparent cover 17 to the T-casing portion 16 in a manner that the connector bracket 20 can be rapidly pulled lose from the holes 21 and 22 to allow the transparent casing 17 to be pulled from the T-shaped portion 16. This allows the quick removal for cleaning of the filter screen 24 which is located directly below the transparent cover 17 and attached over a filter support member 25 which has a plurality of openings 26 therethrough. Filter screen 24 and screen support 25 are spaced from the transparent cover to allow an annular channel 27 for the water to flow from the input 14 through the space 27 on all sides of the filter screen 24 so that the water is flowing directly parallel and adjacent the filter screen 24 as it comes into the casing portion 17 washes trash or sand, or the like, on the filter 24 into the end portion 18 of the filter. In addition, by the water entering as indicated by the arrows parallel to the filter and running against a dead end, a turbulence is created to loosen any material that accumulates on the filter. This self-cleaning action allows the filter to operate for a considerably longer period of time without additional cleaning. In addition, the elongated filter support 25 and filter screen 24 provide a larger filtering surface capable of accumulating a larger amount of trash prior to cleaning. Advantageously, the transparent cover portion 17 allows the filter to be viewed directly to determine whether cleaning is needed and allows a quick cleaning by the unsnapping of the locking bracket 20 and sliding out of the transparent portion 17 to allow the filter 24 to slide off of the filter support 25. Filter screen 24 is held by a stainless steel wire 9 wrapped over openings 26.

Figure 3:
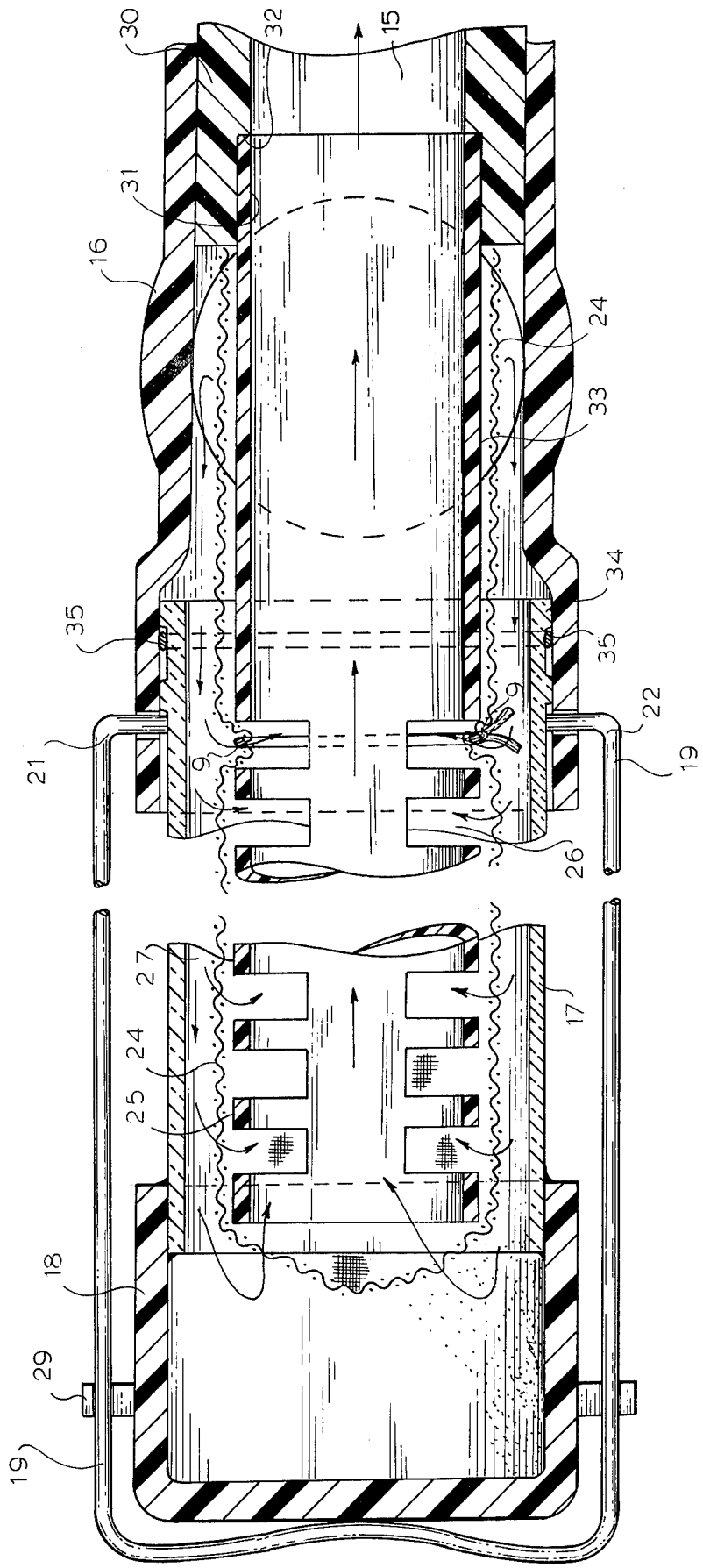
FIG. 3 is a sectional view taken on the line 3—3 of FIG. 1 having a modified locking bracket.

The operation of the inside of the T-joint 16 is more clearly seen in FIGS. 3 and 5 in which a threaded pipe connector 30 may be threadedly attached into a T-joint 16 at the output 15 for attaching the distributor pipe 13 and may have an annular portion 31 reamed in the end thereof to form a ledge 32. This reamed portion 31 may be cut to the same size as the filter support element 25 which has a solid end portion 33, without the openings 26, which can be slide into the reamed portion 31 up against the ledge 32. It can be press-fitted if desired or may be glued or otherwise attached to the reducer 30 to hold the filter screen support 25 in place protruding through the T-joint 16 and out into the transparent filter casing 17. This prevents the water from the input 14 from passing into the output except after being directed along the channel 27 in a counterflow direction which completely surrounds the filter element 24 and which can eventuately pass through the filter screen 24 and through the openings 26 and out the output 15. The transparent cover 17 can be seen having the filter trap in 18 which may be permanently or removably attached as desired and having a pair of raised ledges 34 on the opposite end thereof and an O-ring 35 which fits thereover. Thus, the casing 17 can slide into the T-joint 16 along the internal surface 36 where the locking bracket 20 can snap through the openings 21 and 22 to fit in front of the ledges 34 for holding the transparent filter portion 17 in place. The O-ring 35 prevents the leakage of water and helps provide a snug and secure fit between the casing portion 17 and T-section 16. A slightly modified embodiment has the bracket 20 having an extended loop 19 for snapping over the end portion 18 of the filter to provide additional support for the greater pressure in some systems. In this embodiment a pair of small brackets 29 hold the loop 19 in position centered on end portion 18.

It should be clear at this point that the filtration of water is easily accomplished in a self-cleaning filter which can be easily manufactured and used. It should also be clear that the filter can be made of polyvinyl chloride or any other polymer desired as well as metal and that the filter element 24 can be a sand filter screen but can also utilize other filter mediums as desired. Once the filter is attached it can be periodically checked by merely viewing through the transparent cover 17 to assure that the filter is not filled with too much trash. Once the accumulation of trash gets too large, the transparent cover 17 can be quickly removed by snapping the locking bracket 20 off, removing the transparent cover 17, washing out the trash accumulator 18 and cleaning or replacing the filter screen 24. The filter screen is then merely slipped back over the filter support 25, and the casing portion 17 slid back into the T-portion 36 of the T-casing 16 and the locking brackets 20 snapped in place.

Accordingly, the present invention is not to be construed as limited to the particular forms disclosed herein which are to be regarded as illustrative rather than restrictive.

I claim:

1. A self-cleaning filter apparatus comprising:
   a water pump;
   a T-joint having three openings therein with a first opening connected to said water pump;
   said T-joint having a second opening having an opening reducer attached thereto and a water output pipe connected to said reducer and leading from said T-joint;
   an elongated hollow filter support attached to said reducer limiting said second opening to a passageway through said elongated hollow filter support, said elongated hollow filter support extending through said T-support and out a third opening in said T-joint and said filter support having a solid wall portion and a slotted wall portion, said solid wall portion being located adjacent the first opening in said T-joint, whereby water from said pump is directed into said T-joint and parallel to said filter support slotted portion;
   a removable filter screen removably attached over said elongated filter support to cover said slotted portion thereof;
   a transparent cover attached over said protruding elongated filter support and filter screen and removably attached to said T-joint to enclose said third opening, said transparent cover having a sealed end portion for the accumulation of trash; and
   a quick disconnect bracket for attaching said cover to said T-joint having a pair of protruding members for protruding through openings in said T-joint adjacent an annular ridge located on said cover to removably lock said cover in place, whereby lifting said protruding members allows said transparent cover to be quickly removed and said filter cleaned.

2. A self-cleaning filter apparatus in accordance with claim 1, in which said transparent cover has a pair of annular ridges formed thereon to form an annular groove therebetween, said groove having an O-ring located therein.

3. The apparatus in accordance with claim 2, in which said quick disconnect bracket comprises a U-shaped metal bracket having a protruding member on each end whereby the bracket biases the protruding member through the openings in said T-joint against said cover.

4. The apparatus in accordance with claim 3, in which said quick disconnect bracket extends over said sealed end portion of said transparent cover to further support said cover in said T-joint.

5. The apparatus in accordance with claim 4, in which a pair of quick disconnect bracket support members are attached to said transparent cover sealed end portion for supporting said quick disconnect bracket when said bracket is snapped over said sealed portion of said transparent cover.

* * * * *